Figure 1:
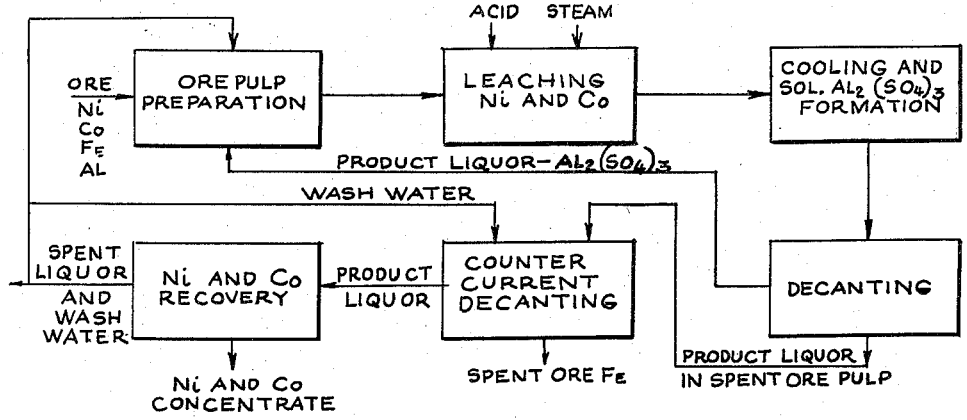

Feb. 3, 1959 J. G. MORROW 2,872,306
RECOVERY OF COBALT AND NICKEL FROM ORES
Filed May 29, 1956

INVENTOR
John George Morrow
BY
ATTORNEYS

United States Patent Office 2,872,306
Patented Feb. 3, 1959

2,872,306

RECOVERY OF COBALT AND NICKEL FROM ORES

John George Morrow, Ottawa, Ontario, Canada, assignor to Freeport Sulphur Company, New York, N. Y., a corporation of Delaware Application May 29, 1956, Serial No. 588,066

10 Claims. (Cl. 75—101)

This invention relates to the recovery of cobalt or nickel or both of them from minerals containing aluminum compounds and generally also iron, along with minor amounts of other metals which also can be recovered. More particularly the invention involves processes for the separation of the cobalt and nickel content of lateritic ores of the limonitic type containing at least one or both of said metals by steps including pulping of the ore, selective acid leaching at high temperatures and pressures, cooling, separating the acidic leach liquor from the spent ore and precipitating the nickel and cobalt from the leach liquor, each of which steps involves special conditions and controls.

In processes of this character, it has been considered essential that the free acid in the product leach liquor first be neutralized in order to make possible the economic recovery of the nickel and cobalt in purified condition, and to accomplish this neutralization, the addition of lime or other alkali has been proposed. In these processes, not only are acid values lost in the neutralization step but also acid is now known to be lost by the conversion of part of the aluminum content into basic aluminum sulfate which precipitates on the tailings.

Because of the low nickel and cobalt content of limonitic ores and the absence of appreciable amounts of other valuable metals in such ores, the problem of recovering the nickel and cobalt successfully involves difficult problems of economy. Accordingly a primary object of the invention is to provide processes for acid leaching and recovery of the cobalt and nickel contents which reduces the amount of acid consumed primarily by recovering a substantial portion of the acid values for reuse in the process.

This objective is accomplished by the utilization of procedures which avoid loss of sulfate values through discharge of the basic aluminum sulfate in the tailings and which avoids the loss of acid values through formation of calcium sulfate by eliminating the step involving neutralization of the product leach liquor by reaction with added lime. The consumption of acid is also reduced by introducing aluminum sulfate into the acid leach solution whereby dissolution of aluminum is apparently decreased. Finally, the precipitation of nickel and cobalt is preferably effected in such manner as to leave a spent liquor containing aluminum sulfate which can be recycled to the leaching step. The temperature of the leaching operation is also controlled to minimize the loss of acid in dissolution of iron.

Broadly expressed, the invention may be considered to involve an improvement in the leaching of the nickel and cobalt content from ores or ore fractions containing either or both of such metals along with aluminum and generally also iron by the action of sulfuric acid in excess at those elevated temperatures and pressures which take up in solution nearly all of the nickel and cobalt content and only part of the aluminum and minor amounts of iron and other undesired metals, in which improvement, part of the leaching action is supplied by an addition of aluminum sulfate produced in the recovery operation and recycled to the leaching step. Instead of neutralizing the excess or free acid remaining in the leach solution upon completion of the leaching reaction by the use of lime or other alkali leading to the production of salts to be discarded to waste, it is taken up from all or part of the product leach liquor in forming soluble aluminum sulfate by reaction with insoluble basic aluminum sulfate in the ore slurry, the reaction being effected by cooling the hot slurry upon completion of the leaching reaction to a temperature at which said reaction will take place (generally below about 200° F.) and permitting the slurry to stand, i. e., aging the slurry, until the free acid or most of it has been taken up, at which point the pH will have risen to a value between about 1 and 3.

Upon completion of the aging step, the leach slurry containing the recovered acid values in the form of aluminum sulfate and generally also a little free acid is separated from the spent ore solids by decanting or other process, if economically feasible, as filtering or centrifuging, then a substantial part of the leach liquor is recycled to the leaching step and the other part is treated to recover the nickel and cobalt content by any suitable procedure but preferably involving conversion to their sulfides. Optimum acid recovery and advantage is obtained when as much as possible of the product leach liquor is recycled, while at the same time the solids accumulating in the liquor are not permitted to reach an unworkable level.

In the foregoing leaching step, the dissolution of the nickel and cobalt content is effected by the action of sulfuric acid obtained from two or more sources, namely: (1) fresh acid introduced into the process, (2) acid regenerated by the heating during leaching from the aluminum sulfate contained in the recycled liquor and generally also in small amounts (3) recycled free acid, and (4) acid regenerated from any iron sulfates present in the solution.

The amount of acid required in the process to accomplish the desired results depends upon many factors including the quantity of metals in the particular ore treated which will be solubilized during the leaching process. In all instances the acid must be present in excess of that consumed during leaching. The amount of excess must be adequate to maintain the dissolved nickel and cobalt content in solution during the subsequent operations. About 15% to 25% total acid in relation to the amount of dry ore is usually sufficient. The hot solution will ordinarily contain about 1% or somewhat more free acid at the conclusion of the leaching step. The pH value of the fresh solution should preferably be below about 2.

The leaching operation is effected at high temperatures preferably of the range of 375° to 500° F. If lower temperatures are employed, such as 260° F. the dissolution of iron will be excessive and if temperatures appreciably higher than 500° F. are employed the nickel and cobalt content or part of the same may become insoluble. The heating and leaching operations are continued until substantially all of the nickel and cobalt content has been dissolved, this end being accomplished ordinarily in 1–3 hours.

Upon completion of the leaching step the slurry is wholly or in part cooled to a temperature at which the insoluble basic aluminum sulfate will in time be converted into soluble aluminum sulfate by reaction with free sulfuric acid remaining in the solution, the temperature to accomplish this result usually being below about 200° F. The slurry is preferably agitated and maintained under the cooled condition for a short time, as from 1 to 4 hours, or until the above-mentioned reaction has progressed to an extent where most or substantially all of the free acid has reacted with the basic aluminum sulfate to form the soluble aluminum sulfate. The acidity of the solution is thereby reduced, the pH being raised to a value of from 1 to 3.

The cooled slurry is thereupon treated in any one of a number of ways to separate the leach solution from the spent ore and to recover the nickel and cobalt values and other valuable metals, if any, from the solution while at the same time retaining the aluminum sulfate and any free sulfuric acid for recycling in the process. In accordance with one embodiment hereinbefore outlined, the cooled slurry is decanted, centrifuged or otherwise treated to separate the product leach liquor from the spent ore, one part of the leach liquor being then treated to recover the nickel and cobalt content, and another part being recycled in the process and employed in the leaching of additional ore. More specifically, the cooled slurry is decanted by a procedure in which part of the product leach liquor, in an amount equaling about 70 to 30% of the solution, is removed in a dense underflow slurry, the remainder of the leach solution, i. e. the overflow, being recycled and utilized with additional acid in leaching the next batch of ore, as hereinbefore described.

During recovery of the nickel and cobalt content and other desirable metals from the spent ore, it is desirable to maintain the leach solution at a pH value below about 3 in order to keep the aluminum sulfate in solution. The product liquor is taken from the dense underflow slurry in a countercurrent decanting system. The nickel and cobalt content can be precipitated from the underflow product liquor in any number of ways as by precipitating with hydrogen sulfide or by neutralizing to a pH value of 7 to 8 or by other means, the spent liquor being sent to waste.

In accordance with a second and more important embodiment of the invention, the cooled pregnant leach liquor is separated from the spent ore in a countercurrent decanting system and the nickel, cobalt and other metals recovered from the liquor while the liquor is at a pH value less than about 3. This recovery is accomplished by the introduction of hydrogen sulfide under high temperature (180 to 300° F.), the product leach solution being at an acidity above about a pH value of 1 and preferably about 2.5. The hydrogen sulfide precipitates the nickel and cobalt from the leach liquor and as well the copper, zinc and various other similarly reacting metals which might be present (not aluminum, iron, magnesium or manganese). The precipitated metals are in the form of their sulfides and the action produces sulfuric acid in the solution.

The metal sulfides thereupon are separated from the product liquor by decanting, centrifuging or filtering and the solution containing free acid and aluminum sulfate is recycled in the process in the manner hereinbefore described. The nickel and cobalt are separated from the other metal compounds and from each other by any suitable method, the methods used not being part of the present invention.

In a variation of this embodiment of the invention, the hydrogen sulfide precipitation may be replaced by electrolysis. The invention, however, contemplates in its broader concepts the use of any recovery method which accomplishes the separation of the metals under acid conditions which leave the aluminum sulfate and preferably also any free acid in the stripped product liquor for recycling in the process.

The instant invention is illustrated by the procedures set forth in the accompanying drawings which are flow sheets of preferred procedures.

In the process illustrated in Fig. 1, the limonitic ore containing nickel and cobalt is pulped with a recycle leach solution containing acid and aluminum sulfate, and wash water is added to provide adequate fluidity for pumping and flowing the pulped ore to the leaching autoclave, a solution containing about 40% solids being satisfactory. Here the pulp or slurry containing particles of minus 100 mesh size is heated preferably by the introduction of steam, to a temperature of 475° F. Thereupon fresh sulfuric acid is added in an amount which provides in the mass a total acid content of about 22.5% of the weight of the dry ore.

After the leaching operation has been completed by heating for a period of 1-3 hours or until 95% of the nickel and cobalt content has been dissolved, the leach solution is cooled to a temperature of about 200° F. at which insoluble basic aluminum sulfate in the solids is converted into soluble aluminum sulfate by reaction with free excess sulfuric acid, the required time for the equilibrium reaction being about 1 hour.

The cooled slurry having a pH value somewhat below about 2.5 is then decanted to provide a dense underflow of spent ore containing about 50% of the product liquor and an overflow of the remainder of the leach solution, which is recycled and utilized in the manner hereinbefore described. The underflow of this decanting operation is then subjected to a countercurrent decanting operation in which wash liquor is utilized to separate the product liquor from the spent ore. The spent ore is conducted from the system to waste and the product liquor is then treated for the recovery of the nickel and cobalt, the spent liquor from this operation being preferably employed in the hereinbefore mentioned decanting operation as wash liquor or it may be wholly or in part sent to waste.

Figure 2:
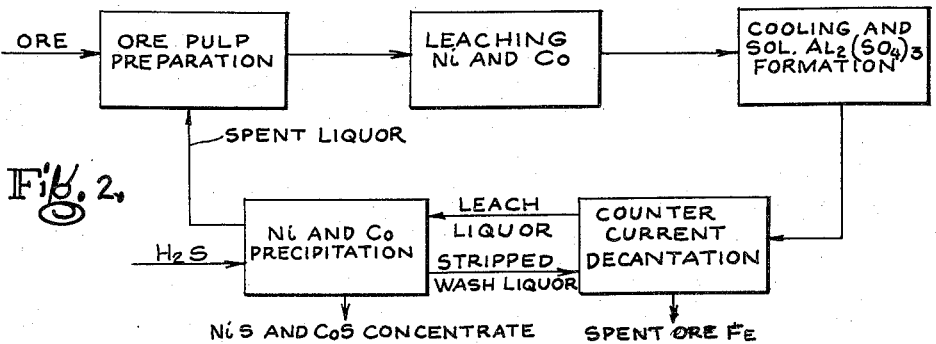

In accordance with the embodiment illustrated in Fig. 2 the ore preparation, the leaching and the cooling operation are conducted in the same manner described in connection with Fig. 1. In this second embodiment the cooled ore, however, is subjected to a countercurrent decantation operation using stripped wash liquor from which operation the spent ore is decanted to waste and the leach liquor in its entirety is subjected to a precipitation treatment by means of hydrogen sulfide. The hydrogen sulfide is introduced into the product leach liquor at a temperature of about 200° F. under $H_2S$ pressure of 100 p. s. i. g., the product leach liquor being at a pH value of about 2. From this step the concentrate of nickel sulfide and cobalt sulfide together with the sulfides of any copper and zinc and other similarly reacting metals present are conveyed to an apparatus for final processing. The stripped leach liquor containing any excess acid remaining from the leaching operation, the acid recovered from the metal sulfates which were sulfided and the aluminum sulfate from the leaching operation is recycled in the process in the manner hereinbefore described.

A very important feature of the foregoing embodiment involving the recycling of aluminum sulfate and the precipitation of the nickel and cobalt by means of hydrogen sulfide is that the re-solution of the basic aluminum sulfate decreases the free acid content of the leach liquor and raises its pH value, thus facilitating the precipitation with the hydrogen sulfide, the nickel and cobalt and also any copper and zinc and other similarly acting metals present are precipitated almost quantitatively while the small amount of iron, aluminum and manganese unavoidably contained in the leach liquor is held in solution.

In connection with the cooling operation the conversion of the basic aluminum sulfate to aluminum sulfate has the effect of neutralizing free acid and thus makes it possible to use lower temperature and pressure conditions during the hydrogen sulfide precipitation operation. The temperature required is lowered as much as 100° F. and the pressure required is reduced by as much as 100 p. s. i. g. Therefore, the cooling operation not only conserves acid by the re-solution of the basic aluminum sulfate but makes it possible to carry out the hydrogen sulfide precipitation under moderate operating conditions.

Figure 3:
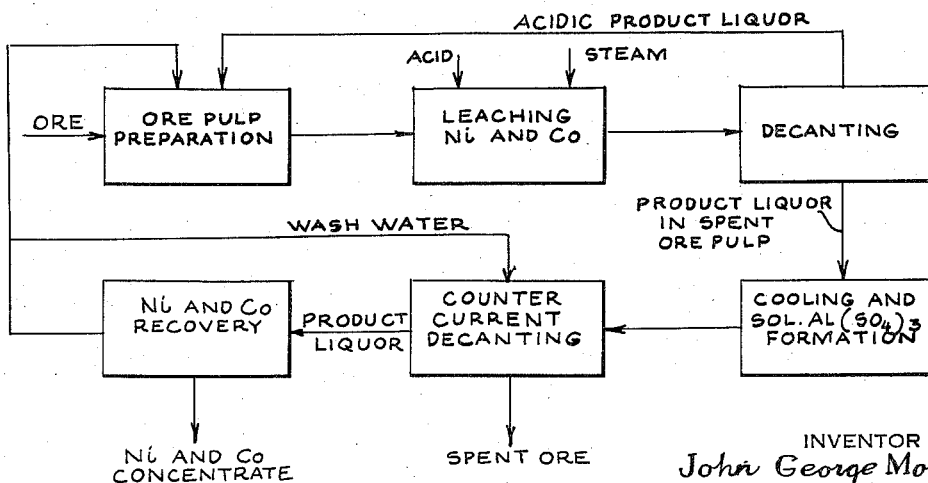

In the embodiment illustrated in Figure 3 the preparation of the ore pulp is effected in an overflow product leach liquor obtained by an undelayed or immediate decantation of the leach liquor discharged from the leaching autoclave. The pulped ore is then flowed to the leaching stage where the additional acid required is added and the slurry heated by means of steam in accordance with the procedure described in connection with the preceding embodiments.

Upon completion of the leaching step, the slurry is flashed and decanted preferably while hot. Since the solid particles settle rapidly in the hot slurry, a single decanting tank may be employed. As above described, the hot overflow from the decantation tank is recycled to the pulping stage. The recycling of the product leach liquor containing free acid reduces the quantity of fresh acid which must be added for effecting the leaching.

The underflow slurry is next cooled and aged to cause the remaining free sulfuric acid to be taken up as aluminum sulfate by reaction with basic aluminum sulfate in the manner hereinbefore described. When this reaction has taken place to an adequate degree, the slurry is then flowed through a countercurrent decantation system to separate the product leach liquor from the spent ore, and the product leach liquor is treated for the recovery of the nickel and cobalt content by the procedures described in connection with the embodiment of Figure 1.

The removal of part of the product leach liquor from the slurry before the same is aged decreases the amount of free acid in the underflow slurry in relation to the amount of basic aluminum sulfate therein. Therefore the free acid may be more easily and thoroughly taken up, and the product liquor substantially freed of acid, is in its most satisfactory condition for economical treatment by hydrogen sulfide for the precipitation of the nickel and cobalt content. Also, under this process, the decanting, cooling and aging equipment may be of smaller size, for there is a smaller volume of liquid to be treated.

The pulping of the ore in the recycle liquors as hereinbefore described has definite advantages but requires pulping equipment resistant to acidic solutions. This pulping operation, however, can be effected in water, after which the water in the pulp is replaced with the recycle liquor. By this replacement (instead of addition), the acid values in the recycle liquid are recovered without materially increasing the volume of liquid in the pulp to an unnecessary and uneconomic level for subsequent treatment. This replacement is effected by flowing the recycle liquor containing the acid values through the water-pulped ore in a multi-stake countercurrent decantation operation. The ore pulp containing the recycle liquor may then be treated by any of the procedures herein described, but preferably is subjected to leaching, cooling, decanting and hydrogen sulfide precipitation of nickel and cobalt as described in connection with Fig. 2.

In each of the embodiments hereinbefore described the over-all consumption of the acid is materially reduced by recovering acid values through the maintenance of a substantial part of the aluminum dissolved from the ore in solution in the acid recycle stream. The saving of acid is primarily due to the fact that the aluminum sulfate liberates sulfuric acid at the leaching temperatures employed, but acid is also saved apparently by the repression of the dissolution of aluminum from the ore by the aluminum sulfate in the recycled stream.

It should be understood that the present invention is not limited to the details hereinbefore described but that it extends to all equivalent procedures and materials which will occur to those skilled in the art upon consideration of the scope of the claims appended hereto.

I claim:

1. In a system for the selective recovery of the cobalt and nickel content from minerals containing aluminum and at least one of the aforesaid metals involving leaching the ore in finely divided condition with an excess of dilute sulfuric acid at elevated temperatures and pressure, the improvement comprising mixing the ore in an aqueous sulfuric acid solution containing aluminum sulfate obtained from the product leach liquor hereinafter specified, heating the resulting ore slurry at the elevated leaching temperature until the nickel and cobalt content has been dissolved, cooling the slurry obtained to a temperature at which basic aluminum sulfate present will convert to aluminum sulfate, aging the cooled slurry until the excess free acid has in substantial part converted basic aluminum sulfate present in the liquor into soluble aluminum sulfate, separating the product leach liquor from the spent ore, recycling the aluminum sulfate in part of such liquor to the leaching step hereinbefore specified and recovering the nickel and cobalt content from the remainder of such liquor.

2. In a system for the selective recovery of the cobalt and nickel content from a limonitic mineral containing aluminum and at least one of the aforesaid metals involving leaching the ore in finely divided condition with an excess of dilute sulfuric acid at elevated temperatures and pressures, the improvement comprising, pulping the ore in an aqueous solution containing sulfuric acid and aluminum sulfate obtained from the product leach liquor hereinafter specified, adding sulfuric acid to the resulting ore slurry, heating the slurry at an elevated leaching temperature until the nickel and cobalt content has been selectively dissolved from the iron content, cooling the hot slurry obtained to a temperature below about 200° F., aging the cooled slurry until the excess free acid has in substantial part converted basic aluminum sulfate present in the liquor into soluble aluminum sulfate, decanting the cooled slurry thereby providing an overflow containing part of the product leach liquor and an underflow containing the spent ore and the remainder of the product leach liquor, recycling the overflow to the pulping step hereinbefore specified, and recovering the nickel and cobalt content from the underflow slurry.

3. In a system for the selective recovery of the cobalt and nickel content from an oxidic lateritic mineral containing compounds of iron and aluminum and at least one of the aforesaid metals involving leaching the ore in finely divided condition with an excess of dilute sulfuric acid at elevated temperatures and pressures, the improvement comprising pulping the ore in an aqueous solution containing sulfuric acid and aluminum sulfate obtained from the product leach liquor hereinafter specified, adding fresh sulfuric acid to the ore, heating the pulped ore slurry at the elevated leaching temperature until the nickel and cobalt content has been selectively dissolved from the iron content, cooling the slurry obtained to a temperature at which basic aluminum sulfate present will convert into aluminum sulfate, aging the cooled slurry until a pH value of from about 1 to 3 is reached, at which point the basic aluminum sulfate present in the liquor has in substantial part been converted into soluble aluminum sulfate, separating the product leach liquor from the spent ore, recycling part of such liquor to the pulping step hereinbefore specified and precipitating the nickel and cobalt content from the remainder of such liquor by introducing hydrogen sulfide into such liquor under elevated temperature and pressure while the latter has a pH value of about 1 to 3.

4. In a system for the selective recovery of the cobalt and nickel content from a limonitic mineral containing aluminum and at least one of the aforesaid metals involving leaching the ore in finely divided condition with an excess of dilute sulfuric acid at elevated temperatures and pressures, the improvement comprising pulping the ore in an aqueous solution containing sulfuric acid and aluminum sulfate obtained from the product leach liquor hereinafter specified, adding sulfuric acid to the resulting ore slurry, heating the ore slurry at the elevated leaching temperature until the nickel and cobalt content has been selectively dissolved from the iron content, cooling the slurry obtained to a temperature at which basic aluminum sulfate present converts into aluminum sulfate, aging the cooled slurry until a pH value of from 1 to about 3 is reached at which point the basic aluminum sulfate present in the liquor has in substantial part been converted into soluble aluminum sulfate, decanting the cooled slurry thereby providing an overflow containing part of the product leach liquor and an underflow containing the spent ore and the remainder of the product leach liquor, recycling the overflow to the pulping step hereinbefore specified, recovering the product leach liquor from the underflow slurry by washing the same in a countercurrent decantation system, precipitating the nickel and cobalt content from the overflow liquor from said system by introducing hydrogen sulfide into the same under an elevated temperature and pressure while the liquor has a pH value of from about 1 to 3.

5. In a system for selectively recovering the nickel and cobalt content from lateritic mineral containing compounds of iron and aluminum and at least one of the aforesaid metals, the improvement comprising mixing the mineral in finely divided condition with a leaching solution containing sulfuric acid and aluminum sulfate in quantities providing an excess of acid during the leaching step, heating the mass at a temperature of at least about 400° F. thereby selectively dissolving the nickel and cobalt content but leaving the iron and part of the aluminum in undissolved state, another part of the latter metal being converted into basic aluminum sulfate, cooling the resulting mass to a temperature of at most 200° F. and after the free acid for the most part has converted basic aluminum sulfate present into aluminum sulfate, decanting the product liquor to provide an overflow solution and an underflow slurry, recycling the overflow solution containing the aluminum sulfate and any remaining free sulfuric acid to the leaching step hereinbefore specified, separating the product liquor in said underflow slurry from the spent ore and recovering the nickel and cobalt content from said liquor.

6. In a system for the selective recovery of the cobalt and nickel content from a limonitic mineral containing aluminum and at least one of the aforesaid metals involving leaching the ore in finely divided condition with an excess of dilute sulfuric acid under high temperatures and pressures, the improvement comprising, pulping the ore in an aqueous solution containing sulfuric acid and aluminum sulfate obtained from the product leach liquor hereinafter specified, adding sulfuric acid to the pulped ore, heating the ore slurry at the leaching temperature until the nickel and cobalt content has been selectively dissolved from the iron content, cooling the slurry obtained to a temperature at which basic aluminum sulfate present converts into aluminum sulfate, aging the cooled slurry until a pH value of from about 1 to about 3 is reached, at which point basic aluminum sulfate present in the liquor has in substantial part been converted into soluble aluminum sulfate, separating the product leach liquor from the spent ore, introducing hydrogen sulfide into such liquor at an elevated temperature and pressure, while the liquor is at a pH value of from about 1 to 3, thereby precipitating the nickel and cobalt content from the solution and producing sulfuric acid in the solution, and recycling said solution containing such acid and aluminum sulfate to the ore pulping step hereinbefore specified.

7. In a system for selectively recovering the nickel and cobalt content from lateritic mineral containing compounds of iron and aluminum and at least one of the aforesaid metals, the improvement comprising mixing the mineral in finely divided condition in a sulfuric acid leaching solution to which has been added recycle liquor containing aluminum sulfate, heating the resulting ore slurry at an elevated leaching temperature until the nickel and cobalt content has been selectively dissolved from the iron content, cooling the slurry obtained containing free sulfuric acid therein to a temperature at which basic aluminum sulfate present converts into aluminum sulfate by reaction with the free acid, aging the cooled slurry until a pH value between about 1 and about 3 is reached, at which point the basic aluminum sulfate present in the liquor will have, in substantial part, been converted into soluble aluminum sulfate, separating the product leach liquor from the spent ore, precipitating the nickel and cobalt content from the product leach liquor by introducing hydrogen sulfide into the same while the liquor is maintained under an elevated temperature and pressure and has a pH value of from about 1 to 3, separating the obtained precipitate from the mother liquor containing acid formed by the action of the hydrogen sulfide as well as aluminum sulfate originally present and returning the separated mother liquor to the leaching step hereinbefore specified.

8. In a system for the selective recovery of the cobalt and nickel content from ores containing aluminum and at least one of the aforesaid metals involving leaching the ore in finely divided condition with an excess of dilute sulfuric acid at elevated temperatures and pressure, the improvement comprising mixing the ore in an aqueous sulfuric acid solution containing aluminum sulfate obtained from the product leach liquor hereinafter specified, heating the resulting ore slurry at the elevated leaching temperature until the nickel and cobalt content has been dissolved, separating part of the acidic leach liquor from the spent ore, recycling said separated leach liquor by returning the same to the leaching step, cooling the remaining slurry obtained from the leaching step to a temperature at which basic aluminum sulfate present will convert to aluminum sulfate, aging the cooled slurry until the excess free acid has in substantial part converted basic aluminum sulfate present in the liquor into soluble aluminum sulfate, separating the product leach liquor having a pH value of from about 1 to 3 from the spent ore, separating the nickel and cobalt content from the remainder of such liquor and recycling the separated liquor containing aluminum sulfate to the leaching step.

9. In a system for the selective recovery of the cobalt and nickel content from ores containing aluminum and at least one of the aforesaid metals involving leaching the ore in finely divided condition with an excess of dilute sulfuric acid at elevated temperatures and pressures, the improvement comprising, pulping the ore in water, replacing the water in the pulp with an aqueous solution containing aluminum sulfate obtained from the product leach liquor hereinafter specified, adding sulfuric acid to the resulting ore slurry, heating the slurry at an elevated leaching temperature until the nickel and cobalt content has been selectively dissolved from the iron content, cooling the hot slurry obtained to a temperature below about 200° F., aging the cooled slurry until it develops a pH value between about 1 and 3 through conversion of basic aluminum sulfate present in the liquor into soluble aluminum sulfate, decanting the cooled slurry thereby providing an overflow containing part of the product leach liquor for recycling and use as hereinbefore specified and an underflow containing the spent ore and the remainder of the product leach liquor, and recovering the nickel and cobalt content from the underflow slurry.

10. In a system for the selective recovery of the cobalt and nickel content from minerals containing aluminum and at least one of the aforesaid metals involving leaching the ore in finely divided condition with an excess of dilute sulfuric acid at elevated temperatures and pressures taking up substantially all of the cobalt and nickel and only part of the aluminum, the process for obtaining the product leach liquor in a condition substantially free of the excess of sulfuric acid which comprises, cooling the hot slurry upon completion of the leaching step carried out at the elevated temperature and pressure, to a temperature at which basic aluminum sulfate present will convert to aluminum sulfate, aging the cooled slurry until the excess free acid has been substantially taken up in the conversion of basic aluminum sulfate present in the liquor in forming soluble aluminum sulfate, thereby providing the product leach liquor substantially freed of the excess sulfuric acid.

References Cited in the file of this patent

UNITED STATES PATENTS

| | | |
|---|---|---|
| 1,075,409 | Dekker | Oct. 14, 1913 |
| 2,551,944 | Haff | May 8, 1951 |
| 2,662,009 | Roberts et al. | Dec. 8, 1953 |